No. 729,462. PATENTED MAY 26, 1903.
A. WEGENER.
CHRISTMAS TREE HOLDER.
APPLICATION FILED SEPT. 19, 1902.
NO MODEL.
Fig. 1.
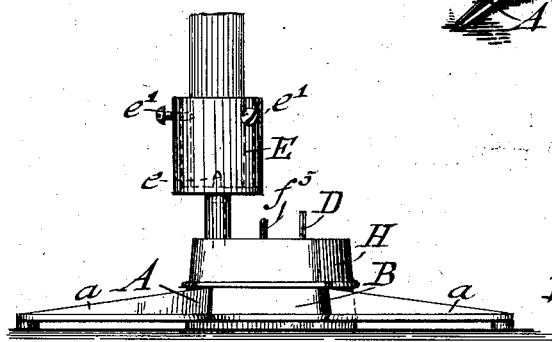
Fig. 2. Fig. 4.
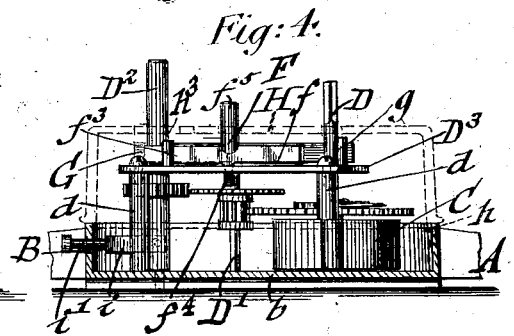
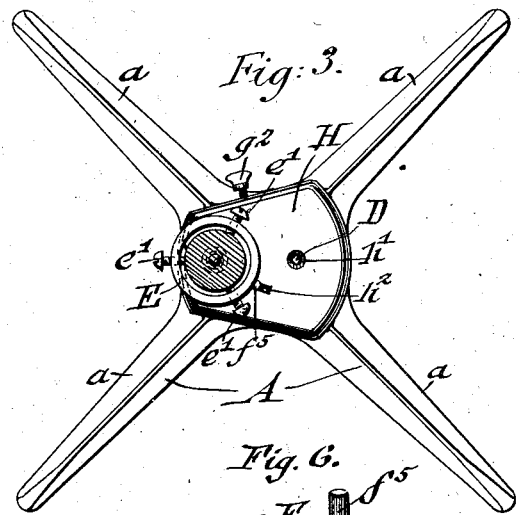
Fig. 3. Fig. 5.
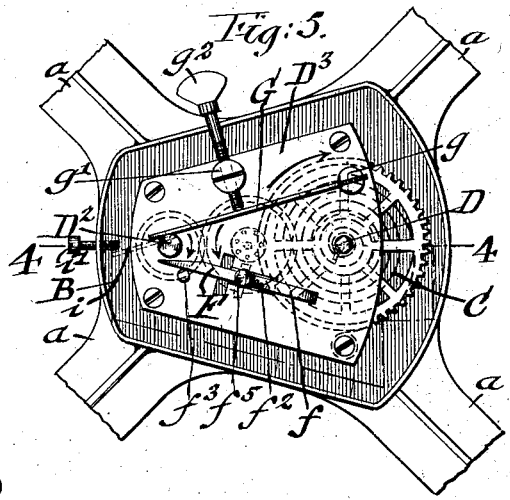
Fig. 6.
Witnesses
C. P. Goepel
Conrad Zimmer.
Inventor
Arnold Wegener
By his Attorneys
Goepel & Niles.

No. 729,462. Patented May 26, 1903.

UNITED STATES PATENT OFFICE.

ARNOLD WEGENER, OF NEW YORK, N. Y.

CHRISTMAS-TREE HOLDER.

SPECIFICATION forming part of Letters Patent No. 729,462, dated May 26, 1903.

Application filed September 19, 1902. Serial No. 124,073. (No model.)

*To all whom it may concern:*

Be it known that I, ARNOLD WEGENER, a citizen of the United States, residing in New York, borough of Manhattan, in the State of New York, have invented certain new and useful Improvements in Christmas-Tree Holders, of which the following is a specification.

The object of this invention is to provide a Christmas-tree holder by which the tree can be adjusted to and held in upright position and rotated about its vertical axis at a suitable speed.

The object is further to provide in a Christmas-tree holder means whereby the speed of rotation of the tree may be regulated as desired, also means whereby the rotation of the tree may be entirely discontinued by a simple and convenient operation, and, furthermore, to afford means protecting the rotating mechanism from injury, dirt, dust, twigs falling from the tree, or other obstruction to the mechanism, and, further, means to protect the floor from any oil flowing from the rotating mechanism.

For these purposes the invention consists of a Christmas-tree holder comprising a base of suitable form, a cup-shaped housing on said base and provided with a closed bottom, a spring-actuated rotating mechanism mounted within said housing and having a vertical main shaft, a socket adapted at its lower end to engage said main shaft and be supported thereon and having an upwardly-projecting interior centering-pin and laterally-adjustable centering-screws above said pin, a stop-brake adapted to engage the main shaft for arresting the same, a drag-brake adapted to engage the main shaft, means for applying said drag-brake adjustably to said main shaft, and a removable cover closing the top of said housing and provided with openings for the main shaft, brakes, and winding-shaft of the rotating mechanism.

The invention consists, further, in certain details of construction and combinations of parts, which will be fully described hereinafter and finally pointed out in the claims.

In the accompanying drawings, Figure 1 represents a perspective view of my improved Christmas-tree holder, together with a Christmas tree supported by the same. Fig. 2 is a side view of the device drawn on a larger scale and showing a portion of the tree-stem inserted into the socket. Fig. 3 is a top view of the parts shown in Fig. 2. Fig. 4 is a vertical section, on a larger scale, on line 4 4, Fig. 5. Fig. 5 is a top view on the same scale as Fig. 4, showing the rotating mechanism and brakes, together with the housing and a portion of the base of the tree-holder; and Fig. 6 is a detail perspective view showing the form of the stop-brake.

Similar letters of reference indicate corresponding parts.

Referring to the drawings, A indicates the base of my improved Christmas-tree holder, which may be of any suitable form, but which is preferably made in the form shown, having four diverging leg members $a$. Upon the base is mounted a cup-shaped housing B, which housing may be made integral with the base, as indicated, and is provided with a closed bottom $b$. Within the housing is mounted the tree-rotating mechanism. This mechanism may be constructed in the form shown, comprising a spring C, mounted upon a winding-shaft D and geared through an intermediate shaft $D'$ with a vertical main shaft $D^2$. These shafts D $D'$ $D^2$ are supported at their lower ends in suitable bearings in the bottom of the housing, but do not extend through the bottom of said housing, and at their upper portions are supported by a plate $D^3$, connected by suitable posts $d$ with the housing. Upon the main shaft $D^2$ is supported a socket E, open at its upper end for receiving the trunk of the Christmas tree to be supported and adapted at its lower end to engage upon and be supported by the main shaft. The socket is provided at its interior with an upwardly-projecting centering-pin $e$, located approximately at the center of the bottom of the socket, so as to enter into the wood of the tree-trunk and prevent the latter from shifting sidewise in the socket when the trunk is of too small size to exactly fit the socket, as indicated in Figs. 2 and 3. Three centering-screws $e'$ are arranged in the upper portion of the socket, so as to screw horizontally toward or from the axis of the socket, and thereby permit the adjustment of the tree-trunk from the outside of the socket into the exact vertical position, the centering-pin serving to hold the extreme lower end of the tree-trunk in one position, and thereby enabling the proper adjustment of the tree into perfectly vertical position to be made by the centering-screws $e'$.

Upon the pillar-plate $D^3$ of the rotating mechanism is arranged a stop-brake F, which comprises an elongated body portion $f$, having a shank $f'$ sliding in a suitable groove $f^2$ in the pillar-plate $D^3$. The slot $f^2$ is directed so as to guide the forward end of the brake $f$ against the main shaft $D^2$, and the brake is caused to engage at its forward tapering end $f^2$ with said shaft by means of a stationary brake-pin $f^3$, located on the pillar-plate adjacent the main shaft. A cross-piece $f^4$ below the shank $f'$ prevents escape of the shank from the slot $f^2$. The brake F is provided with an operating finger or handle $f^5$.

For regulating the speed of rotation of the tree a drag-brake is provided which comprises a bar G, of stiff spring metal or other suitable elastic material, secured at its rear end by means of a post $g$ to the pillar-plate and extending at its forward end opposite the main shaft $D^2$. A post $g'$ is mounted on the pillar-plate at some point opposite the brake-bar G, and a thumb-screw $g^2$ is mounted horizontally in said post $g'$, so as to bear at its inner end against the brake-bar G, and thereby force the same into contact with the main shaft $D^2$, so as to produce any desired amount of friction, and thereby retard the rotation of the tree to any desired extent. For providing friction so that the thumb-screw $g^2$ is always retained in the position into which it is set and does not too easily rotate in the post $g'$ the post is split vertically transversely to the screw $g^2$, this being done in the process of manufacture, and the thread then put through the post, when the two parts of the same are pressed closely together so as to close up the slit made by the tool used in splitting the post. The screw is then put in while the two parts are still pressed together. The parts are then released and tend to spring apart, thereby forming a friction device, creating sufficient friction upon the screw to prevent the same becoming loose in the thread of the post. A cover H is provided which is adapted to fit over the rotating mechanism and brakes, so as to exclude dirt, dust, and twigs which may fall from the tree. The cover is provided at its lower edge with a flange $h$, adapted to fit within the housing B, and thereby secure the cover firmly in place, while at the same time permitting its removal whenever desired. At its upper portion the cover is provided with an opening $h'$ for the winding-shaft D and with a slot $h^2$ for the handle $f^5$ of the stop-brake. The cover is also provided with an opening $h^3$ for the main shaft $D^2$ and at one side with a vertical recess $h^4$ for the thumb-screw $g^2$ of the drag-brake.

The operation of my improved Christmas-tree holder will be apparent from the foregoing description. The tree having been inserted in the socket E and adjusted into vertical position or so as to be balanced therein and the spring C wound by means of a key applied to the winding-shaft D, the stop-brake, which during the winding was in forward position engaged with the main shaft, is now pushed into rearmost position out of engagement with said shaft, and the spring exerts its power through the gears, and thereby turns the main shaft and with it the socket and tree supported in the same. In the case of large trees the friction between the main shaft $D^2$ and the bottom $b$ of the housing will be sufficient so that the drag-brake need not ordinarily be applied. In the case of smaller trees, however, it is desirable to apply the drag-brake, and this is done by simply screwing up the thumb-screw $g^2$ to the desired extent, whereby the brake-bar G is forced more or less tightly against the main shaft and the speed of the tree thereby regulated.

When it is desired to stop the tree entirely, the stop-brake is simply pushed forward, so as to engage the main shaft. The direction of rotation of the main shaft is such as to draw the tapering stop-brake more firmly into engagement with the same as soon as the contact is made, and the tree is thereby quickly brought to a stop. The shafts of the rotating mechanism, including the main shaft, are seated in suitable sockets in the bottom $b$ of the housing. Said sockets do not extend through the housing, however, so that all oil which is used for lubricating the rotating mechanism and which by reason of the vertical position of the shafts has a tendency to collect at the bottom of the same is retained within the housing and cannot escape upon the carpet or floor beneath the base. Owing to the cup-shaped form of housing, a considerable quantity of oil may be employed, so that the lower ends of the sockets are thoroughly lubricated at all times and the device thereby enabled to operate with the greatest efficiency. Whenever it is desired to clean or adjust the parts, the tree-socket E is first removed and then the cover H bodily lifted off, whereby all the parts are opened up to inspection or cleaning.

In place of or in addition to the drag-brake may be employed an exhibit-brake, consisting of a flexible brake-finger $i$, secured to and extending laterally from the main shaft $D^2$ within the housing B, and a screw $i'$, mounted in the wall of the casing and adjustable so as to project more or less into the path of the brake-finger $i$. When the main shaft is turned, the finger $i$ engages the screw, and thereby retards the shaft until, owing to the further turning of the shaft and yielding of the spring-finger $i$, the latter is moved out of engagement with the brake-screw $i'$ and the shaft again permitted to turn free. By this brake the tree is caused to rotate slower at a certain part of each revolution, so as to exhibit for a longer time toward one direction a certain part of the tree. This intermittent retardance may be regulated by adjusting the screw $i'$ so as to be hardly perceptible or so as to permit a considerably longer view of one portion of the tree.

Having thus described my invention, I claim as new and desire to secure by Letters Patent—

1. A Christmas-tree holder, consisting of a base, a spring-actuated tree-rotating mechanism mounted on the same, an intermittently-acting exhibit-brake for said mechanism, and means for adjusting said brake, substantially as set forth.

2. A Christmas-tree holder, consisting of a base, a spring-actuated tree-rotating mechanism mounted on the same, a drag-brake for said mechanism, an intermittently-acting exhibit-brake for said mechanism, and means for adjusting said brake, substantially as set forth.

3. A Christmas-tree holder, consisting of a base, a spring-actuated tree-rotating mechanism mounted on the same, a drag-brake for said mechanism, a stop-brake for said mechanism, an intermittently-acting exhibit-brake for said mechanism, and means for adjusting said brake, substantially as set forth.

4. In a Christmas-tree holder, the combination, with a shaft of the tree-rotating mechanism, of a stop-brake having a tapering end for engaging said shaft, and a brake-pin adjacent the shaft, the forward tapering end of said brake being arranged so as to enter between said shaft and pin, substantially as set forth.

5. In a Christmas-tree holder, the combination, with a shaft of the tree-rotating mechanism, of an exhibit-brake composed of a flexible brake-finger secured to said shaft, and a brake-screw mounted adjacent and adapted to be screwed into the path of said brake-finger, substantially as set forth.

6. In a Christmas-tree holder, a base, a housing mounted on the same, a tree-rotating mechanism mounted within said housing and having vertical shafts, a horizontally-movable brake adapted to engage one of said shafts and having an upwardly-projecting finger, and a removable cover adapted to fit upon said housing and provided with openings for shafts of the rotating mechanism and with a slot for said brake-finger, substantially as set forth.

7. A Christmas-tree holder, consisting of a base, a cup-shaped housing on said base and provided with a closed bottom, a spring-actuated tree-rotating mechanism mounted within said housing and having a vertical main shaft, a socket adapted at its lower end to engage said main shaft and be supported thereon, and having an upwardly-projecting interior centering-pin and laterally-adjustable centering-screws above said pin, a stop-brake adapted to engage the main shaft for arresting the same, a drag-brake adapted to engage the main shaft, means for adjusting said drag-brake, and a removable cover closing the top of said housing and provided with openings for said brakes and the winding-shaft of the rotating mechanism, substantially as set forth.

In testimony that I claim the foregoing as my invention I have signed my name in presence of two subscribing witnesses.

ARNOLD WEGENER.

Witnesses:
PAUL GOEPEL,
JOSEPH H. NILES.